United States Patent [19]

Kishimoto et al.

[11] Patent Number: 4,805,104
[45] Date of Patent: Feb. 14, 1989

[54] APPARATUS FOR CONTROLLING HYDRAULIC PRESSURE TO BE APPLIED TO EFFECT BRAKING OF WHEELS

[75] Inventors: Masashi Kishimoto, Kariya; Ken Asami; Kazunori Sakai, both of Nagoya, all of Japan

[73] Assignees: Nippondenso Co., Ltd., Kariya; Toyota Jidosha Kabushiki Kaisha, Toyota, both of Japan

[21] Appl. No.: 95,183

[22] Filed: Sep. 11, 1987

[30] Foreign Application Priority Data

Sep. 11, 1986 [JP] Japan .................. 61-216822
Jul. 7, 1987 [JP] Japan .................. 62-168968
Sep. 9, 1987 [JP] Japan .................. 62-225497

[51] Int. Cl.$^4$ .............................. B60T 8/64
[52] U.S. Cl. ................... 364/426.01; 303/111; 303/95; 180/197
[58] Field of Search ........... 364/426; 180/197; 303/111, DIG. 1, DIG. 2, DIG. 3, 95, DIG. 4, 105, 106, 110; 361/238

[56] References Cited

U.S. PATENT DOCUMENTS 3,637,264  1/1972  Leiber et al. ............... 303/105
4,585,280  4/1986  Leiber ................. 303/DIG. 4 X
4,660,896  4/1987  Matsuda ................... 364/426
4,749,239  6/1988  Onogi et al. ............. 364/426 X

FOREIGN PATENT DOCUMENTS 51-89096  8/1976  Japan .
60-47751  3/1985  Japan .

Primary Examiner—Eugene R. Laroche
Assistant Examiner—Seuny Ham
Attorney, Agent, or Firm—Cushman, Darby & Cushman

[57] ABSTRACT

A wheel slipping control apparatus for controlling a braking hydraulic pressure to be applied to a wheel so as to perform an effective braking operation. The wheel slipping control apparatus comprises a control unit for generating a control signal in accordance with the wheel slipping state so as to perform a braking pressure control cycle so that the braking hydraulic pressure is set to a pressure decreasing mode and then to a pressure increasing mode. In the control unit, one of the braking pressure control cycles to be performed is determined as a learning control cycle to obtain a learning pressure-decreased value decremented in the learning control cycle and to obtain a learning pressure-increased value incremented in the learning control cycle. A present pressure-decreased value decremented in a control cycle after the learning control cycle is obtained to calculate a target pressure-increased value on the basis of the obtained learning pressure-decreased value and learning pressure-increased value whereby the braking hydraulic pressure is first increased to the vicinity of a wheel locking limit pressure after decreased in the pressure-decreasing mode.

9 Claims, 13 Drawing Sheets

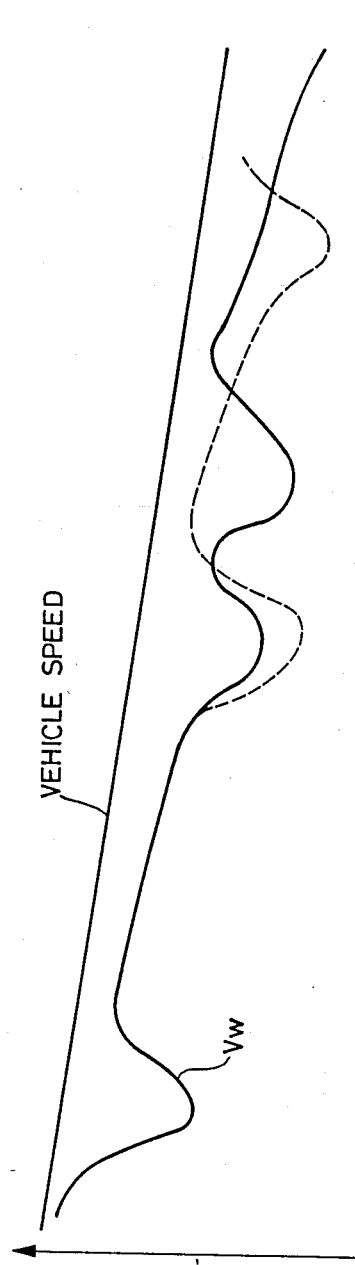
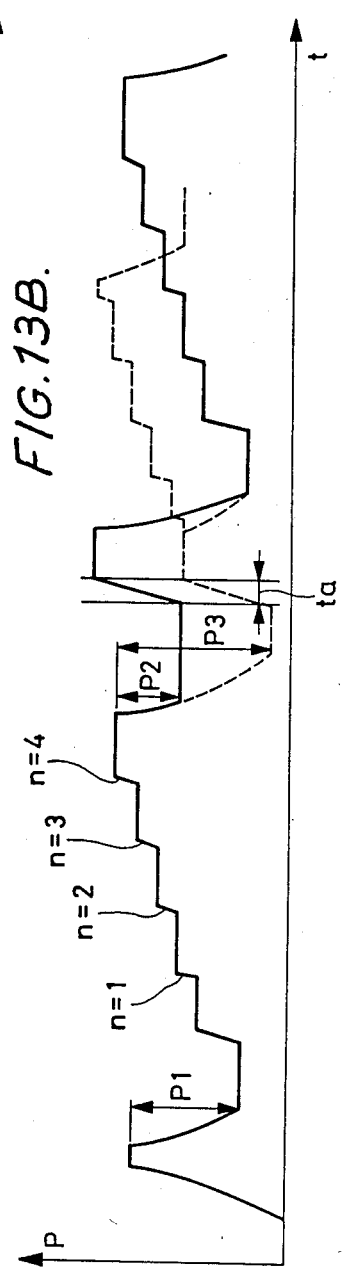
FIG. 13A. (PRIOR ART)
FIG. 13B.

APPARATUS FOR CONTROLLING HYDRAULIC PRESSURE TO BE APPLIED TO EFFECT BRAKING OF WHEELS

BACKGROUND OF THE INVENTION

The present invention relates generally to an apparatus for controlling a braking hydraulic pressure to be applied to each of wheels of a motor vehicle.

Anti-skid control systems are known as systems for principally controlling the braking hydraulic pressure in a brake control system to prevent the motor vehicle from being slipped laterally due to locking of a vehicle wheel on a rapid braking operation. For effectively performing the braking operation, it is desirable that the braking hydraulic pressure is increased in advance to a pressure value immediately before occurrance of the locking of the vehicle wheel and is kept for a long time as it is. However, since the locking pressure is varied in accordance with the running road surface state, initially taking a long time to increase the hydraulic pressure may result in excessive increase of the hydraulic pressure and locking of the vehicle wheel. Therefore, it is not allowed to increase the hydraulic pressure at once and it may be required to gradually increase the hydraulic pressure in accordance with the slipping state of the vehicle wheel. This does not result in effective braking control.

An attempt to avoid this problem is disclosed in Japanese Patent Provisional Publication No. 60-47751, where, as shown in FIG. 13 of this application, the locking prevention apparatus is arranged such that in the present pressure increasing control cycle, a time ta taken for increasing the pressure is determined as $ta = f(n)$ where f is a constant function and n (=4) is the number of times that the hydraulic pressure has been increased in the previous pressure increasing control cycle. However, in such a locking prevention apparatus there arises problems because of no consideration of the previously decreased hydraulic pressure P1 and the present decreased hydraulic pressure P2. More specifically, if there is the difference in the braking responsibility between two types of the motor vehicles, the difference results in variation of the present decremented hydraulic pressure (P2, P3). That is, the decrement of hydraulic pressure is varied, for example, between the first type in which the releasing of the braking force is highly responsive to the decrease of the hydraulic pressure and the slipping of the vehicle wheel is settled rapidly and the second type in which the responsibility is slightly inferior to the first type and the wheel slipping is settled gradually. Furthermore, the inertia force of the driven wheel is varied in accordance with the gear position of the transmission and the settlement of the wheel slipping is made under different conditions. For example, the slipping is rapidly settled under the condition of the neutral gear position and the slipping is rgradually settled due to the engine braking action under the condition of the low-speed gear position. Therefore, when applied to a motor vehicle, the conventional apparatus requires to appropriately and accurately obtain the function f(n) in consideration of braking responsibility and so on. If the function f(n) is not appropriate, there provides a problem in that, when as indicated by P2 in FIG. 13 the presently decreased amount of the hydraulic pressure is small, the next pressure increasing time period ta results in the fact that the braking hydraulic presure exceeds the lock limit pressure, and when as indicated by P2 in the figure the present decrement is great, the pressure increasing time period ta results in the fact that the braking hydraulic pressure is separated insufficiently from the lock limit pressure.

SUMMARY OF THE INVENTION

It is therefore an object of the present invention to provide a new and improved wheel slip control apparatus which can be applied easily for motor vehicles irrespective of variations of the braking responsibility and which is capable of initially increasing the hydraulic pressure smoothly to the vicinity of the locking limit pressure of the wheel.

According to a feature of the present invention, a wheel slipping control apparatus comprises a control unit for generating a control signal in accordance with the wheel slipping state so as to perform a braking pressure control cycle so that the braking hydraulic pressure is set to a pressure decreasing mode and then to a pressure increasing mode. In the control unit, one of the braking pressure control cycles to be performed is determined as a learning control cycle to obtain a learning pressure-decreased value decremented in the learning control cycle and to obtain a learning pressure-increased value incremented in the learning control cycle. A present pressure-decreased value decremented in a control cycle after the learning control cycle is obtained to calculate a target pressure-increased value on the basis of the ratio of the obtained learning pressure-decreased value and learning pressure-increased value whereby the braking hydraulic pressure is first increased to the vicinity of a wheel locking limit pressure after decreased in the pressure-decreasing mode.

In accordance with the present invention, there is provided a wheel slipping control apparatus for controlling a braking hydraulic pressure to be applied to a wheel, comprising: sensor means for detecting a rotational speed of said wheel; detection means for detecting the slipping state on the basis of the detected rotational speed of said wheel; control means for generating a control signal in accordance with the detected slipping state so as to perform a braking pressure control cycle so that the braking hydraulic pressure is set to a pressure decreasing mode and then to a pressure increasing mode; and pressure adjusting means for controlling the braking hydraulic pressure in accordance with the generated control signal, wherein said control means including: means for determining one of the braking pressure control cycles to be performed as a learning control cycle; means for obtaining a learning pressure-decreased value corresponding to the magnitude of pressure decremented in the learning control cycle; means for obtaining a learning pressure-increased value corresponding to the magnitude of pressure incremented in the learning control cycle; means for obtaining a present pressure-decreased value corresponding to the magnitude of pressure decremented in a control cycle after the learning control cycle; and means for calculating a target pressure-increased value on the basis of the obtained learning pressure-decreased value, learning pressure-increased value and present pressure-decreased value, and for generating a signal indicative of the calculated target pressure-increased value to said pressure adjusting means so that the braking hydraulic pressure is first increased to the vicinity of a wheel locking limit pressure after decreased in the pressure-decreasing mode.

BRIEF DESCRIPTION OF THE DRAWINGS

The object and features of the present invention will become more readily apparent from the following detailed description of the preferred embodiments taken in conjunction with the accompanying drawings in which:

FIG. 13 is a timing chart for describing a prior art control apparatus.

DETAILED DESCRIPTION OF THE INVENTION

Figure 1:
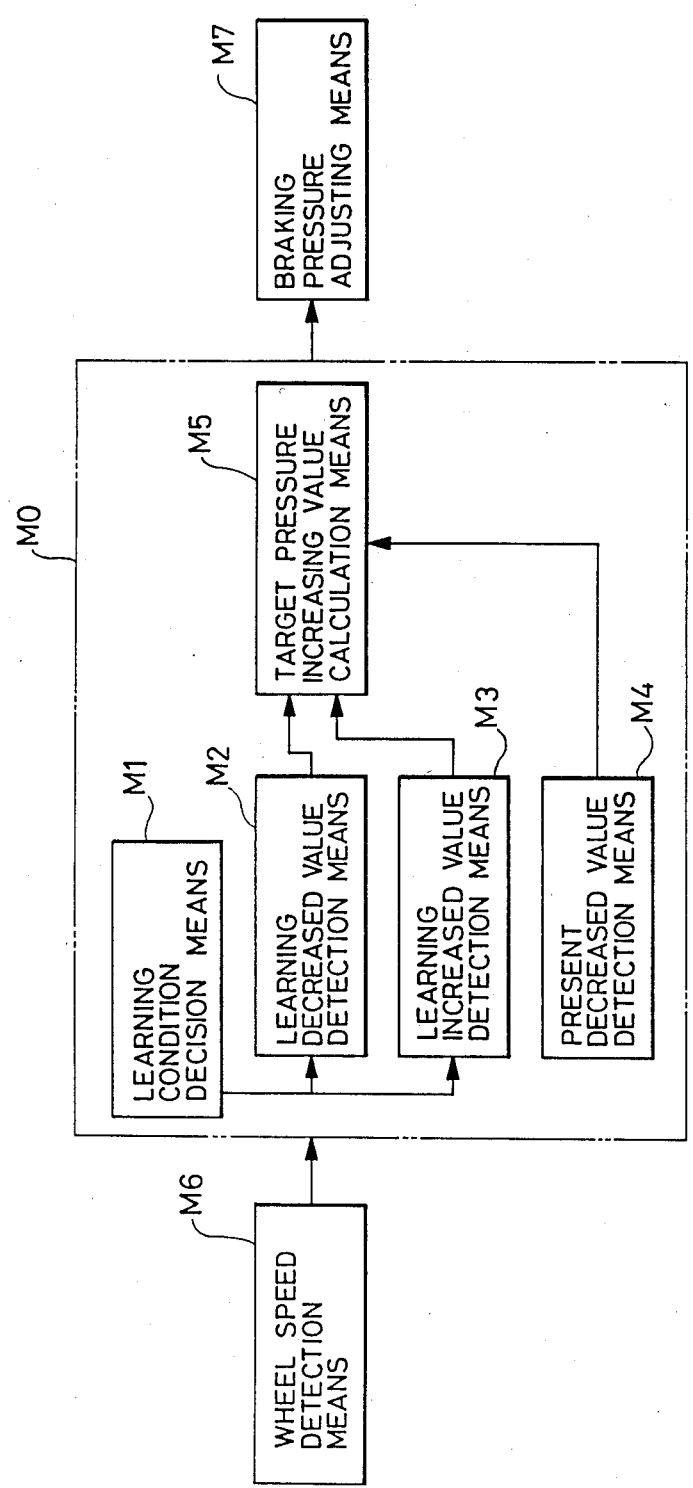
FIG. 1 is a schematic diagram showing the basic arrangement of the present invention.

Prior to describing the embodiments of the present invention in detail, a brief description of the basic arrangement of the invention will be first made with reference to FIG. 1 for a better understanding of the invention. The wheel slipping control apparatus according to the present invention is shown in FIG. 1 as basically comprising wheel speed sensing means M6, control means M0 and braking pressure adjusting means M7. The control means M0 generates a control signal in accordance with the slipping state of the wheel obtained on the basis of the rotational speed signal from the wheel speed sensing means M6 so that the braking hydraulic pressure is set to either the pressure-increasing mode or the pressure-decreasing mode. The braking pressure adjusting means M7 is responsive to the control signal so that a control cycle in which the braking pressure is once decreased from a value corresponding to the locking limit pressure and again increased to the value corresponding to the locking limit pressure is repeatedly performed several times, resulting in the adjustment of the braking hydraulic pressure and the basic execution of the wheel slipping control.

The control means M0 includes learning condition decision means M1 for determining a learning control cycle to be learned, learning pressure decrement detection means M2 for obtaining the learning pressure-decreased value corresponding to the magnitude decreased in the learning control cycle, learning pressure increment decision means M3 for obtaining the learning pressure-increased value corresponding to the magnitude increased in the learning control cycle, present pressure decrement detection means M4 for obtaining the current pressure-decreased value corresponding to the magnitude decreased in a control cycle after the learning control cycle, and target pressure-increase command value calculating means M5 for generating a cmmand signal indicative of a first target pressure-increased value in the control cycle in which the present pressure decrement is obtained, the first target pressure-increased value being obtained in accordance with a function: learning pressure-increased value/learning pressure-decreased value x the present pressure-decreased value.

The learning condition decision means M1 performs a decision on the basis of the presence or absence of the learing value, that is, determines, under the condition of the absence of the learning value, that the control cycle is a learning control cycle. In this learning control cycle, the learning pressure decrement detection means M2 and the learning pressure increment detection means M3 respectively obtain the learning pressure-decreased value and the learning pressure-increased value corresponding to the decreased and increase magnitudes. In a control cycle thereafter, the present pressure decrement detection means M4 obtains the present pressure-decreased value corresponding to the magnitude decreased in the cycle. The target pressure-increase command value calculating means M5 calculates the first target pressure-increased value in the cycle in which the present pressure-decreased value has been obtained, in accordance with the above-mentioned function. A command signal indicative of the first target pressure-increased value is supplied from the control means M0 to the braking pressure adjusting means M7 so that the braking pressure is controlled appropriately. That is, the locking limit pressure, which is the highest value in the range in which the wheel locking does not occur, can be obtained on the basis of the learning pressure-decreased value and the learning pressure-increased value obtained in accordance with the road surface condition and the present pressure-decreased value obtained in the control cycle thereafter. This will be understood from the following. That is, in response to start of the wheel slipping control, repeatedly performed is a control cycle in which the braking pressure is once decreased from the value corresponding to the locking limit pressure and again increased thereto. At this time, since the learning control cycle and the current control cycle are in short time relation to each other, the variation of the road surface state, or locking limit perssure, does not occur substantially therebetween and, in other words, the road surface states or locking limit pressures in those cycles are substantially equal to each other. Therefore, the ratio of the learning pressure-decreased value and the learning pressure-increased value in the learning control cycle is equal to that of the pressure-decreased value and the pressure-increased value in the current control cycle, i.e., learning pressure-decreased value:learning pressure-increased value=present pressure-decreased value:target pressure-increased value. Because the above-mentioned function is obtained from this equation, it is possible to accurately calculate the first target pressure-increased value. Thus, after the learning control cycle, the braking pressure can be increased rapidly by the first target pressure-increased value which has been obtained on the basis of the locking limit pressure, resulting in shortening the braking distance and performing an effective braking operation.

If the road surface state is varied after the learning control cycle, the learning pressure-decreased value and the learning pressure-increased value are cleared and a new learning will be effected to allow a more practical braking operation.

Figure 2:
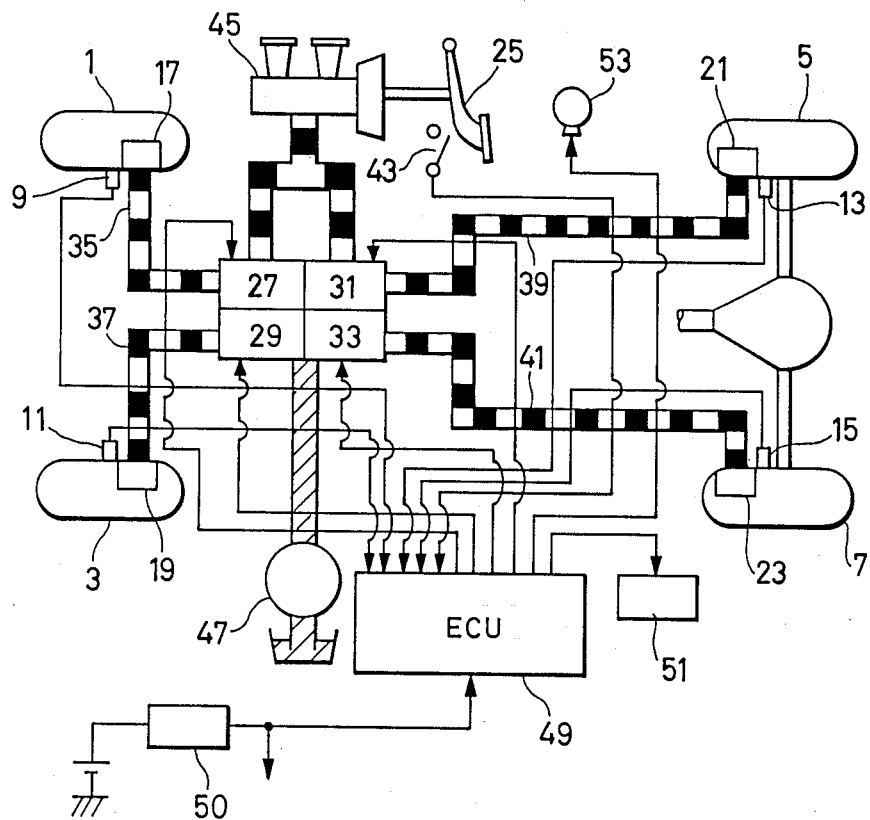
FIG. 2 is an illustration of a wheel slipping control apparatus according to a first embodiment of the present invention which is incorporated into a motor vehicle.

Referring now to FIG. 2, there is schematically illustrated an arrangement of a wheel slip control apparatus according to a first embodiment of the present invention, which is incorporated into a four-wheel motor vehicle wherein the front wheels are steered and the rear wheels are driven. In FIG. 2, rotational speed sensors 9, 11, 13 and 15 which are of electromagnetic pickup type or of photoelectric conversion type are respectively provided for the front-right wheel 1, front-left wheel 3 rear-right wheel 3 and rear-left wheel of the motor vehicle and generate pulse signals in accordance with rotational speeds of the respective wheels 1, 3, 5 and 7. Further for the respective wheels 1, 3, 5 and 7 are provided hydraulic pressure braking devices 17, 19, 21 and 23. The hydraulic pressures generated due to depression of a brake pedal 25 or operation of pressure control actuators 27, 29, 31 and 33 are supplied through hydraulic pressure passages 35, 37, 39 and 41 to the respective hydraulic pressure braking devices 17, 19, 21 and 23. Therefore, the braking forces for the wheels 1, 3, 5 and 7 can be adjusted by means of the actuators 27, 29, 31 and 33 or the brake pedal 25. The degree of depression of the brake pedal 25 is detected by a stopswitch 43 which generates an ON signal during braking and generates an OFF signal during non-braking.

Normally, the hydraulic pressure is produced in a hydraulic pressure cylinder 45 in response to the depression of the brake pedal 25, thereby allowing the braking of the respective wheels 1, 3, 5 and 7. On the other hand, as a hydraulic pressure source for wheel slippage control, a hydraulic pressure pump 47 is further provided which generates a hydraulic pressure in response to driving of the engine or electric motor. An electronic control unit (ECU) 49 controls the respective actuators 27, 29, 31 and 33 so that the hydraulic pressure from the hydraulic pressure cylinder 45 or the hydraulic pressure pump 47 is regulated before supplied to the respective hydraulic pressure braking devices 17, 19, 21 and 23, and the braking forces for the wheels 1, 3, 5 and 7 are independently adjustable. It is also appropriate that the hydraulic pressure braking devices 21 and 23 for the rear wheels 5 and 7 are controlled by only one actuator. In this case, three actuators are used for hydraulic pressure regulation. A main relay 51 is arranged so as to switch the connection between the electromagnetic solenoids of the actuators 27, 29, 31 and 33 and a power supply source, and an indicator lamp 53 is provided for informing a system abnormality to the vehicle driver and is energized by a signal from the electronic control unit 49 in response to failure of the slippage control apparatus such as disconnection of the wheel rotational speed sensors 9, 11, 13 and 15, breaking of the electromagnetic solenoids of the actuators 27, 29, 31 and 33, and disconnection of the stopswitch 43.

Figure 3:
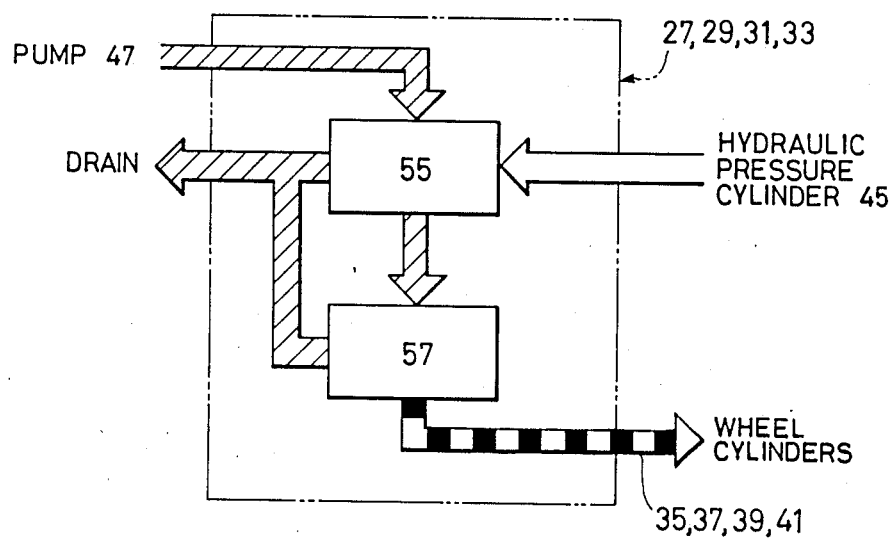
FIG. 3 is an illustration for describing the functions of actuators.

The electronic control unit 49 is powered in response to turning-on of an ignition switch 50 and is responsive to signals from the wheel rotational speed sensors 9, 11, 13 and 15 and a signal from the stopswitch 43 in order to perform processes for the slippage control and generates output signals for control of the main relay 51, the indicator lamp 53 and the actuators 27, 29, 31 and 33. Each of the actuators 27, 29, 31 and 33, as shown in FIG. 3, comprises a regulator section 55 and a control valve section 57 with an electromagnetic solenoid for performing the switching between the braking hydraulic pressure increasing, decreasing and maintaining modes, the regulator section 55 being provided for selecting one of the hydraulic pressure from the hydraulic pressure cylinder 45 and the hydraulic pressure from the hydraulic pressure pump 47 and for regulating the hydraulic pressure to a predetermined value. The hydraulic pressures outputted from the respective actuators 27, 29, 31 and 33 are transferred through the hydraulic pressure passages 35, 37, 39 and 41 to wheel braking cylinders of the respective hydraulic pressure braking devices 17, 19, 21 and 23 whereby the respective wheels 1, 3, 5 and 7 are braked independently in accordance with the transferred hydraulic pressures. The braking hydraulic pressure control electromagnetic solenoid of the above-mentioned control valve section 57 is arranged so that the hydraulic pressure is increased or decreased during energization or maintained in accordance with the current level thereof. The magnitudes of the hydraulic pressures are controlled in accordance with the time period of the hydraulic pressure supply to the respective hydraulic pressure braking device 17, 19, 21 and 23 (pressure-increasing time period) or the time period of the hydraulic pressure release therefrom (pressure-decreasing time period). That is, as the pressure-increasing time is longer, the hydraulic presure becomes higher, and, as the pressure-decreasing time is longer, the hydraulic pressure becomes lower.

Figure 4:
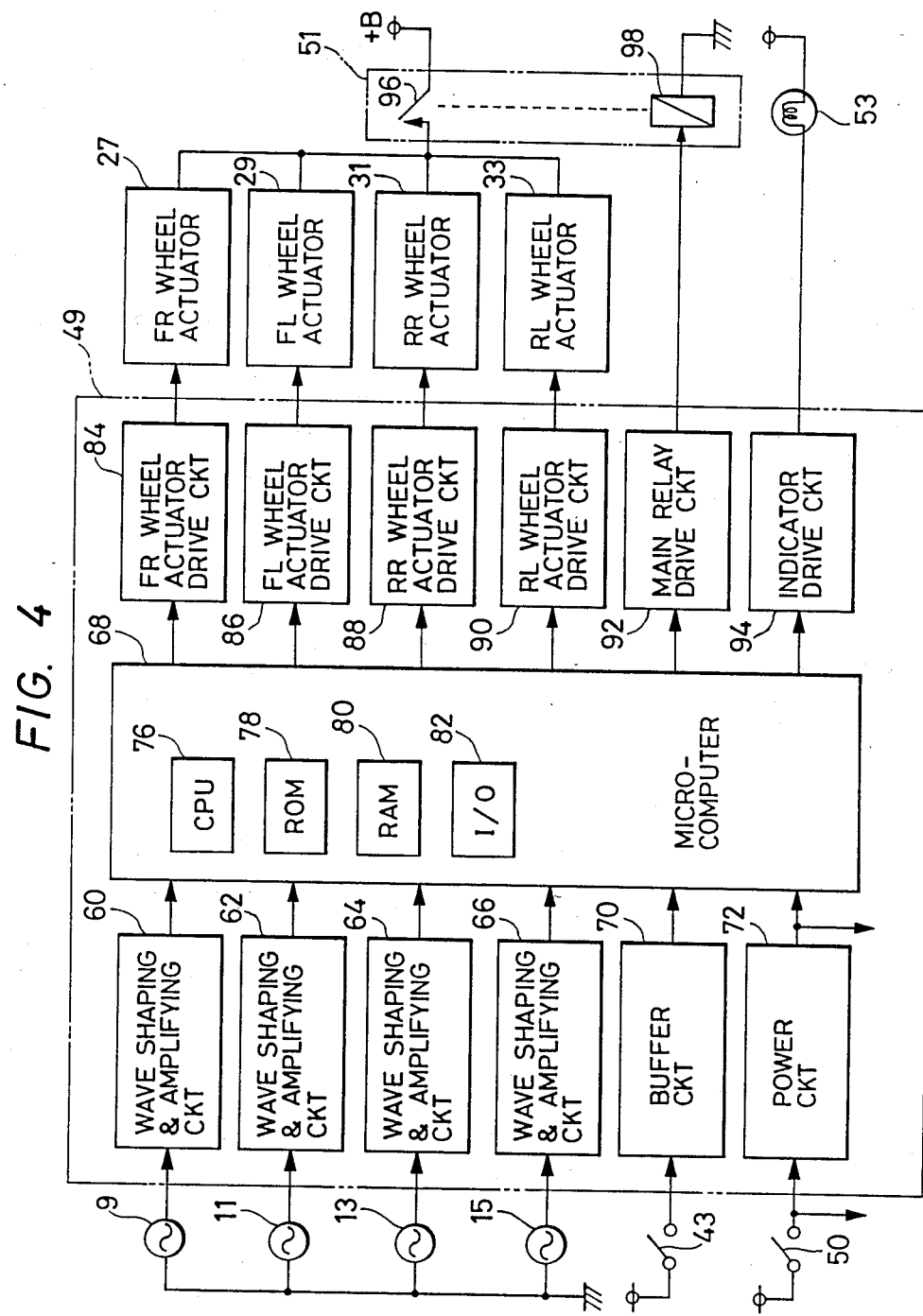
FIG. 4 is a block diagram showing a detailed arrangement of an electronic control unit which is used for the present invention.

The electronic control unit 49 is arranged as shown in FIG. 4. Waveform shaping and amplifying circuits 60, 62, 64, and 66 respectively convert the signals from the respective wheel speed sensors 9, 11, 13 and 15 into pulse signals which are adaptable to a microcomputer 68, and a buffer circuit 70 temporarily holds the signal from the stopswitch 43. A power supply circuit 72 supplies a constant voltage to the microcomputer 68 and so on in response to the turning-on of the ignition switch 50. The microcomputer 68 is provided with a central processing unit (CPU) 76, a read only memory (ROM) 78, a random access memory (RAM) 80, an input/output circuit (I/O) 82 and so on, and produces control signals on the basis of the input data and supplies the control signals to drive circuits 84, 86, 88, 90, 92 and 94 which in turn generate output signals in accordance with the control signals from the microcomputer 68. Of these drive circuits, the actuator drive circuits 84, 86, 88, 90 drive the electromagnetic solenoids of the respective actuators 27, 29, 31 and 33, and the main relay drive circuit 92 energizes a coil 98 of the main relay 51 so that a normally opened contact 96 is closed. The indicator lamp drive circuit 94 turns on the indicator lamp 53.

Operation and Process of an anti-skid control apparatus thus arranged will be desribed hereinbelow. In response to thurning-on of the ignition switch 50 of the motor vehicle, a constant voltage from the power supply circuit 72 is applied to the microcomputer 68 and so on and the CPU 76 of the microcomputer 68 starts the arithmetic processes in accordance with a program stored in advance in the ROM 78.

Figure 5A:
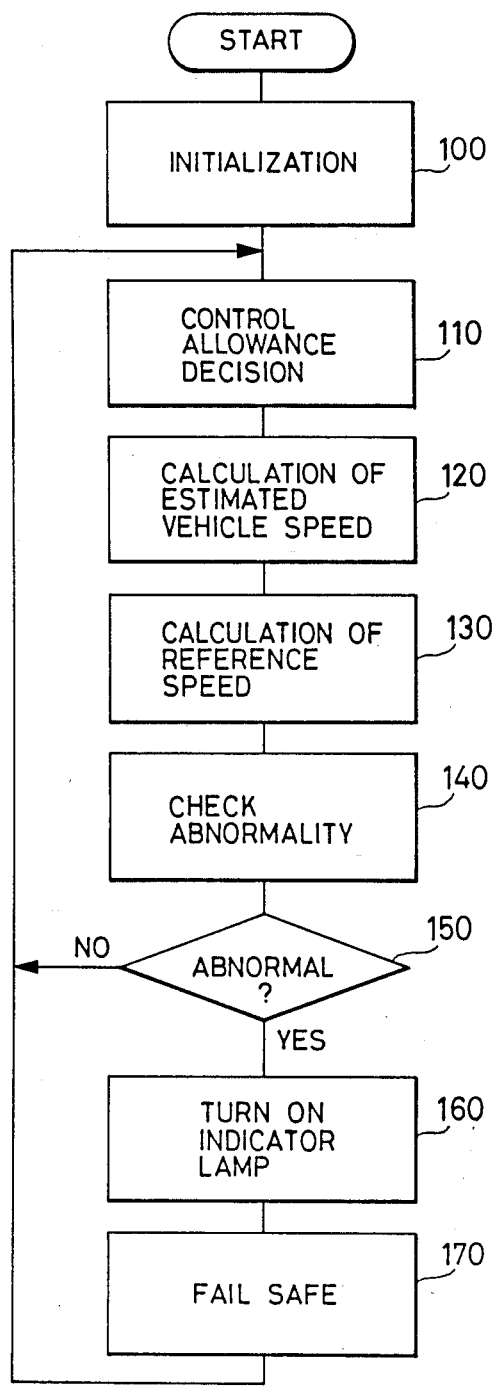
FIG. 5A is a flow chart for describing the principal processes executed by a microcomputer.

FIG. 5A is a flow chart schematically showing the basic process in this arithmetic operation. The basic process starts with a step 100 for initialization, for example, various counters which will be described hereinafter are cleared. Thereafter, in accordance with the result of the decision of a step 150, a series of steps 110 through 150 or a series of steps 110 through 170 are repeatedly performed until the ignition switch 50 is turned off. The step 110 is provided for execution of a control allowance decision process. That is, performed is a process for determining the need that an anti-skid control, which will be described hereinafter, is effected in response to depression of the brake pedal by the vehicle driver, a process for determining execution of the operation in which, when a system abnormality is present in the step 150, the anti-skid control is inhibited and control is switched therefrom to the normal braking operation or the like. In the step 120, an estimated vehicle speed calculating process is performed to calculate an estimated vehicle speed. That is, The estimated vehicle speed is determined by selecting the highest speed of the wheels speeds of the four wheels and then by assuming a value between the upper limit speed and the lower limit speed obtained on the basis of the highest wheel speed and the previously determined estimated vehicle speed in consideration of the upper limit of the vehicle acceleration and the upper limit of the vehicle deceleration which can be taken in the actual vehicle travelling state, including the braked state. The step 130 is executed to perform a reference speed calculating process to obtain a reference speed for starting the pressure decrease, a refernce speed for preventing malfunction resulting from vehicle vibration, i.e., road surface noise, and so on on the basis of the estimated vehicle speed determined in the step 120.

Control then goes to the step 140 to check the system abnormality. Data corresponding to operating states of the system elements on system normal operation which are stored in advance in the ROM 78 are compared with data representing operating states of the system elements read in the process. If the decision made in accordance with the comparison is the system abnormality, an abnormality flag is set to represent that the system operating state is abnormal. If the decision is made as normality, the abnormality flag is kept in the reset state or turned. The step 150 checks the abnormality in accordance with the state of the flag. If the system is normal, control goes to the control allowance decision process step 110. If the system is abnormal, the steps 160 and 170 are successively executed and then control goes to the step 110. The step 160 is provided for informing to the vehicle driver that the system is abnormality and the anti-skid control is not effective. In the step 160, only when the decision of the system abnormality in the decision step 150 is the first time, a control signal is gnerated to the indicator lamp drive circuit 94 to energize the indicator lamp 53. The indicator lamp drive circuit 94 latches the control signal to successively light the indicator lamp 53. In the step 160, it is also appropriate that, if the system is returned to the normal state after the output of the control signal, a control sisgnal is supplied to the indicator lamp drive circuit 94 to turn off the indicator lamp 53. The step 170 is provided for performing a fail-safe process, where a control signal is generated to deenergize the coil 98 of the main relay 51 so that the braking hydraulic pressure control is set to the non-anti-skid control, that is, is switched to the normal mode that the braking is performed by the hydraulic pressure in response to depression of the brake pedal 25, irrespective of the states of the pressure increasing, maintaining and decreasing electromagnetic solenoids of the four acuators 27, 29, 31 and 33. In response to deenergization of the coil 98, the contact 96 is switched to the opening state whereby the power supply for the electromagnetic solenoid of each of the actuators 27, 29, 31 and 33 is cut off so that the normal braking operation is effected until released from the system abnormality. In this system fail-safe process step 170, it is also appropriate that, in order to further improve the safe, a control signal is additionally supplied to each of the actuator drive circuits 84, 86, 88 and 90 to deenergize the solenoid.

Figure 5B:
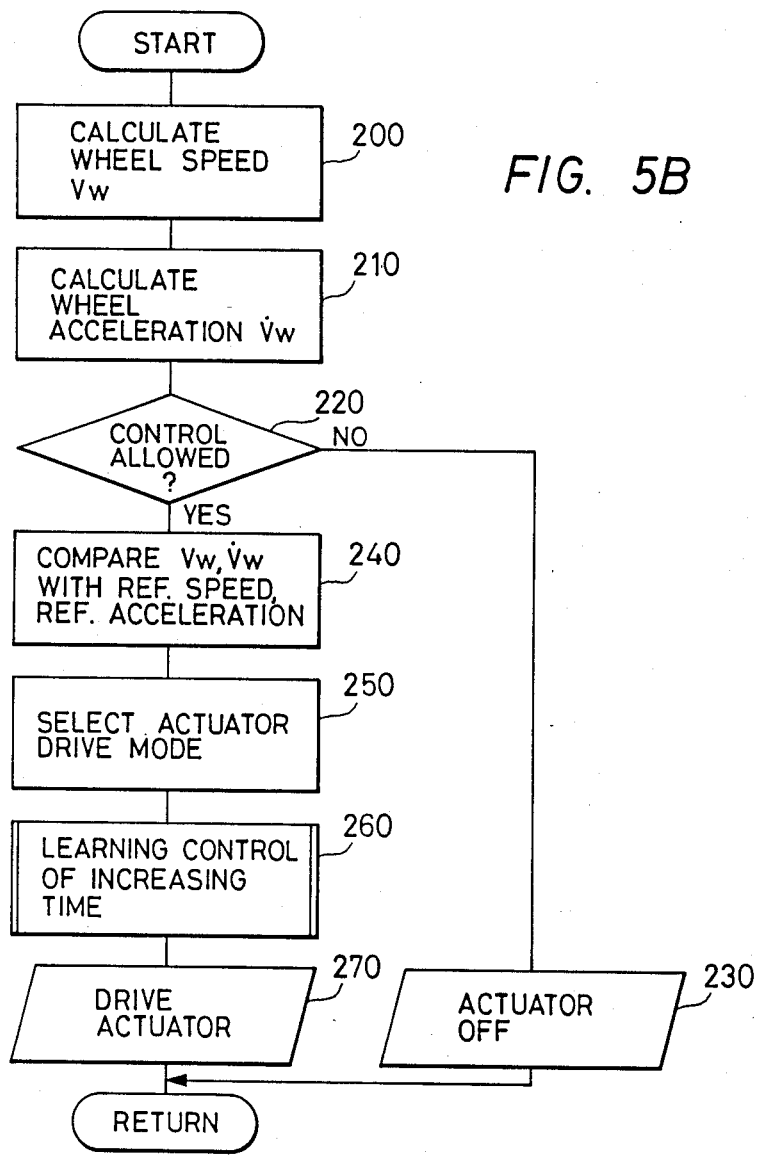
FIG. 5B is a flow chart showing a timer interrupt routine executed for each of wheels.

FIG. 5B is a flow chart showing a timer interrupt routine at a predetermined interval on execution of the FIG. 5A control processes. This timer interrupt routine starts with a step 200 in which the speed of each of the wheels is calculated. In the wheel speed calculating step 200, the wheel speed is obtained using the difference between the pulse count value in the current process and the pulse count value in the previous process, the time interval, and constant in accordance with a given equation. If required, a filter process for averaging the obtained wheel speeds. After execution of the step 200, a step 210 is executed to calculate the wheel acceleration of each of the wheels. In this wheel acceleration calculating step 210, the wheel acceleration is obtained on the basis of the difference between the wheel speed in the current execution and the wheel speed in the previous execution of the step 200, the time interval and constant in accordance with a given equation. If required, process substantially corresponding to the filter process is aditionally performed for averaging.

A subsequent step 220 checks whether the decision is the step 110 of FIG. 5A represents the control allowance state. If not allowed, that is, in the case that the stop switch 43 is not turned on or in the other cases, the process advances to a step 230. On the other hand, if allowed, that is, in the case that the control allowance flag is set, steps 240 through 270 are successively executed. In the step 230, a control signal is supplied to each of the actuators drive circuits 84, 86, 88 and 90 so that all of the actuators 27, 29, 31 and 33 are respectively returned to the non-operated state. In response to receipt of the control signals, each of the actuator drive circuits 84, 86, 88 and 90 is kept to the state corresponding to each of the control signals and the solenoid of each of the actuators 27, 29, 31 and 33 is deenergized and the braking hydraulic pressure control is performed in the normal mode. On the other hand, in the step 240 which is executed when the control is allowed, the respective wheel speeds and the respective wheel acceleration calculated in the above-mentioned wheel speed calculating step 200 and the wheel acceleration calculating step 210 are respectively compared with the respective reference speeds calculated in the reference speed calculating step 130 of FIG. 5A and the respective accelerations set in advance. A step 250 is then executed to perform a process to select a drive pattern of each of the pressure increasing, maintaining and decreasing electromagnetic solenoids in accordance with the results of the comparison in the step 240. The drive patterns for the solenoids are stored in advance in the ROM 78. This process includes a pressure decreasing mode taken in accordance with the increase of wheel slip rate or the increase of the wheel deceleration and a stepwise pressure increasing mode comprising pressure increasing and pressure maintaining taken in accordance with the wheel restoration.

A step 260 is provided for performing a learning control process of the pressure increasing time period of the present invention in which a target hydraulic pressure coefficient is calculated on the basis of the pressure decreasing time period in the pressure decreasing mode and the added value of the pressure increasing time periods in the stepwise pressure increasing mode comprising the pressure increasing and pressure maintaining so that the first pressure increasing amount in the next stepwise pressure increasing mode and the ratios of the pressure increasing time periods and the pressure maintaining time periods taken thereafter are varied in order to make small the average hydraulic pressure inclination per time after the learning control is performed. This will be described in detail hereinafter.

In a step 270, a control signal representing the final pattern is supplied to the corresponding one of the actuator drive circuits 84, 86, 88 and 90 which in turn generates the drive outputs to determine the drive states of the actuators 27, 29, 31 and 33. After the step 270, the processes of FIG. 5A which is now interrupted is subsequently executed.

Figure 5C:
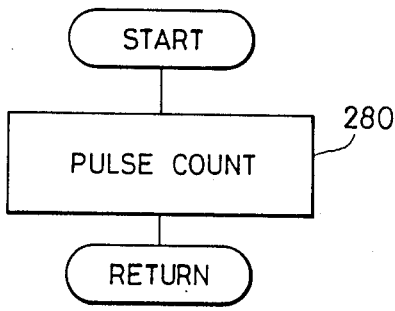
FIG. 5C is a flow chart showing an interrupt routine executed in response to a pulse signal from each of wheel speed sensors.

FIG. 5C is a flow chart showing an interrupt routine executed in connection with each of the rotational speed sensors 9, 11, 13 and 15. The interrupt routine is executed each time that the pulse signal from the rotational sensor and the waveform shaping and amplifying circuit is inputted into the microcomputer 68. During the execution of this interrupt routine, the above-mentioned processes are interrupted. A step 280 is first executed to count the pulses therefrom, the count value being used for the wheel speed calculating step 200 in the above-mentioned timer interrupt routine.

Figure 6:
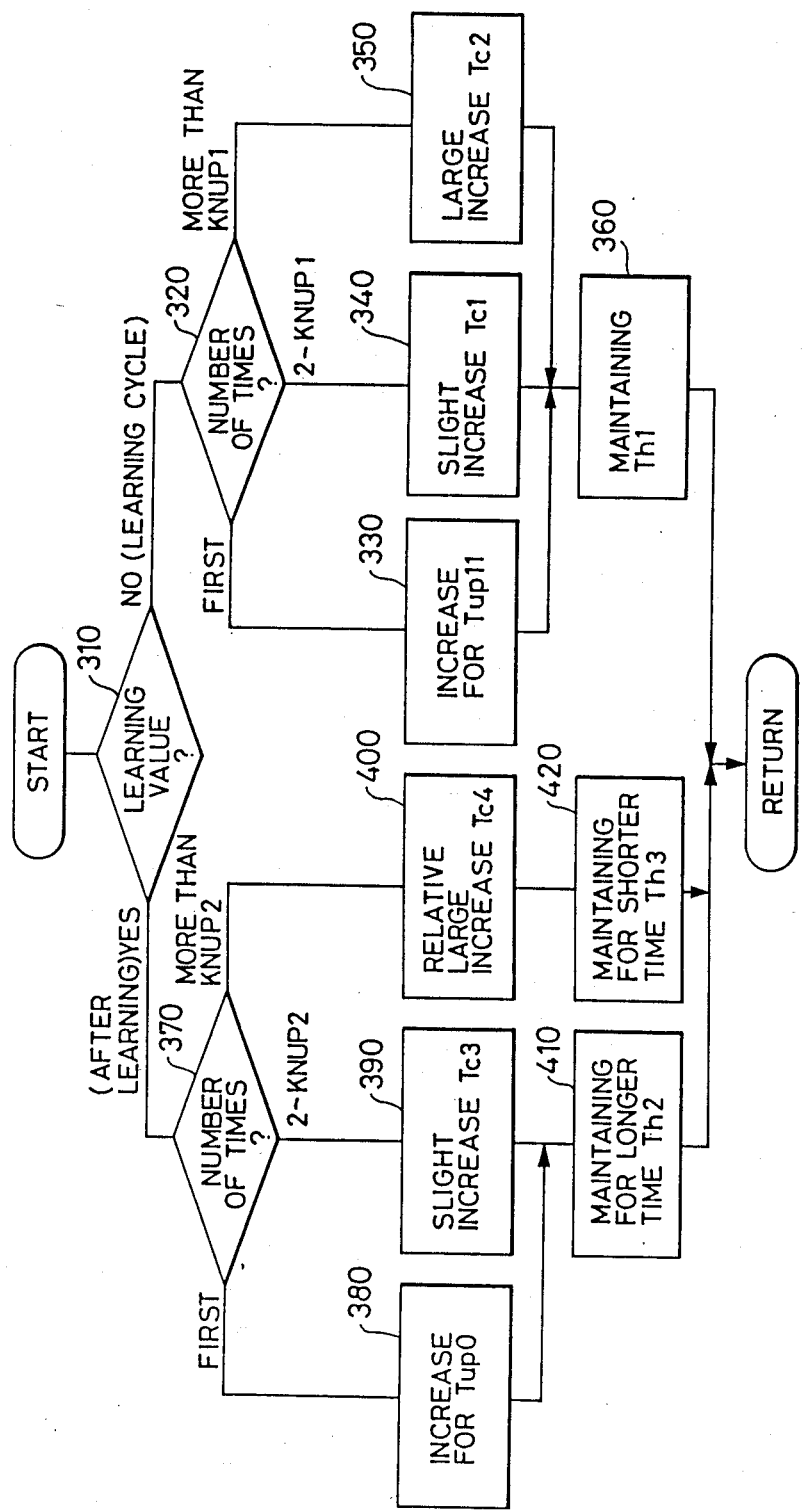
FIG. 6 is a flow chart for describing a stepwise pressure increasing control in the first embodiment.

The stepwise pressure increasing control executed in the step 260 of FIG. 5B will be described in detail with reference to the flow chart of FIG. 6.

In response to starting of the control, a step 310 is executed to check whether a learning value is present, the learning value being a value determined in the pressure increasing time learning control which will be described hereinafter. The learning value is set after the first (learning) control cycle, that is, it is absent at the start time of the slip control. Thus, the decision in the step 310 is negative, thereby followed by a step 320 to check the number of times that the pressure increasing is performed after the start of the step 200 control. If first time, in a step 330, the pressure increasing is performed for the pressure increasing time period Tup11 which is calculated on the basis of the wheel acceleration $\dot{V}w$ and the pressure decreasing time Tdw1 in the first control cycle. This pressure increasing time period Tup11 is set to be longer as the pressure decreasing time period Tdw1 becomes longer and is set to be longer as the wheel acceleration $\dot{V}w$ becomes greater. If the number of times is 2 to KNUP1 in the step 320, a step 340 is executed where a relatively slight pressure increasing is performed, that is, the pressure increasing is performed only for a predetermined pressure increasing time period Tc1. If the number of times is not less than KNUP1+1 in the step 320, a step 350 is executed wherein a relatively large pressure increasing is performed, that is, the pressure increasing is performed for a predetermined pressure increasing time period Tc2 (>Tc1). After the pressure increasing, the braking pressure is maintained for a predetermined time period in a subsequent step 360.

In the case that the stepwise pressure increasing control corresponds to the stepwise pressure increasing in a control cycle after the learning control cycle, the learning value is obtained from the pressure decreasing time period Tdw1 and pressure increasing time periods Tup11, Tup12, Tup13, Tup14 in the first control cycle. Thus, after the next control cycle, the decision in the step 310 is positive, followed by a step 370 in which the number of times of the pressure increase is checked. If the pressure increase is the first time increase in the control cycle after the learning control cycle, a step 380 is executed where the hydraulic pressure is increased for a first target pressure increase time period Tupn (Tup21). The first target pressure increasing time period Tupn is obtained in accordance with a calculation which will be described hereinafter. If the number of times is 2 to KNUP2 in the step 370, a step 390 is executed where a relatively slight pressure increase is performed for a predetermined time period Tc3 (Tc3<Tc1) as compared with that of the step 340. If the number of times is not less than KNUP2+1, a step 400 is executed where a relatively large pressure increase is performed for a predetermined time period Tc4 (Tc4>Tc3). After the execution of pressure increasing in the step 380 or 390, a step 410 is executed where the braking pressure is maintained constant for a predetermined time period Th2 (Th2>Th1) which is longer than that of the learning control cycle (step 360). After the execution of the step 400, in a step 420, the braking pressure is kept constant for a relatively short time period Th3 (Th3<Th2).

According to this stepwise pressure increasing control, a proper and rapid pressure increasing can be performed with the learning value in the first time pressure increasing in the stepwise pressure increasing control after the learning control cycle. Furthermore, since, after the pressure increasing based on the learning value, the hydraulic pressure can be maintained for a long time with it being close to the locking limit pressure by a longer maintaining time period is taken, an effective braking is achieved and the braking distance becomes shorter.

Figure 7:
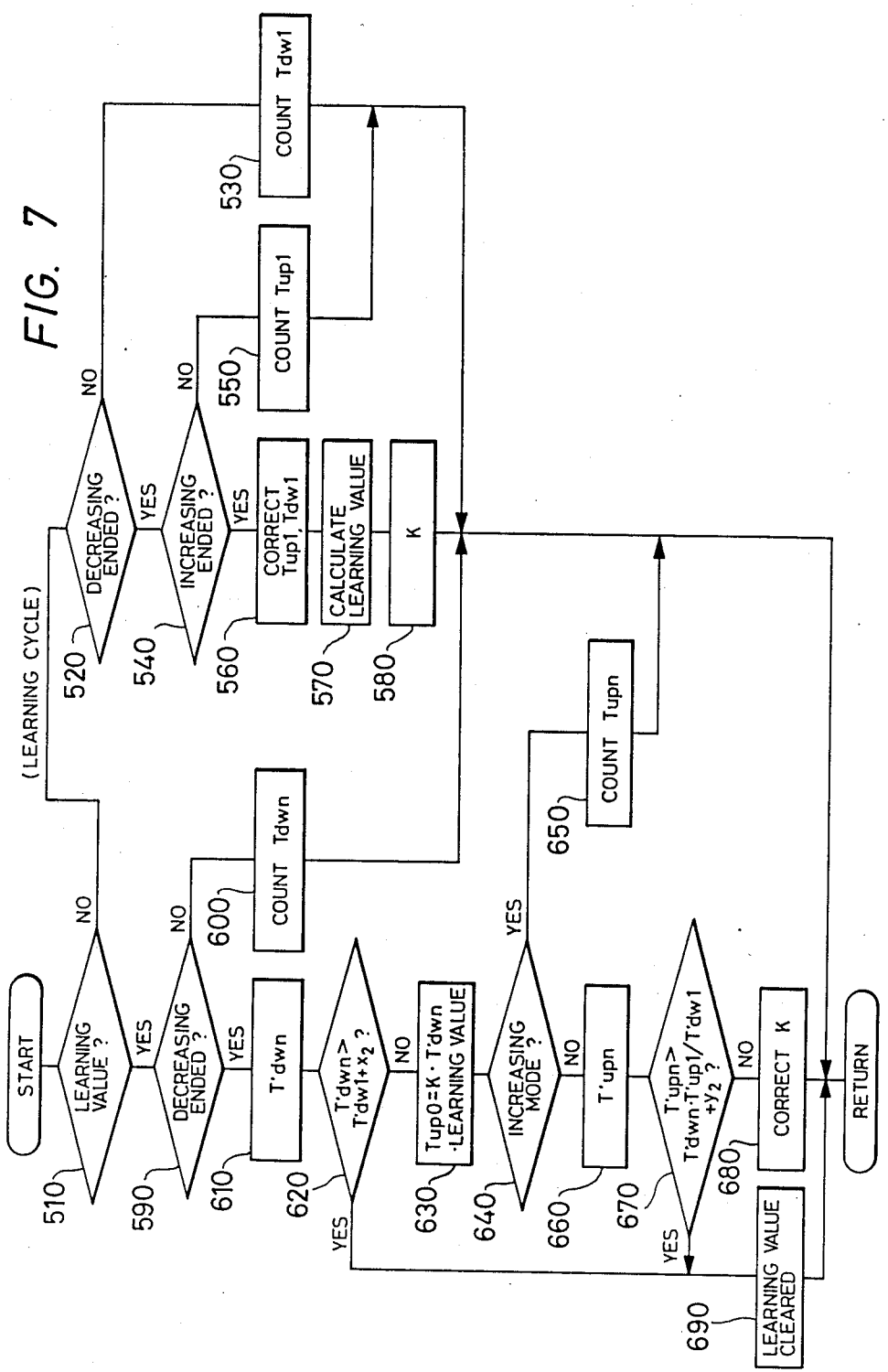
FIG. 7 is a flow chart for describing a pressure increasing time learning control in the first embodiment.
Figure 8A:
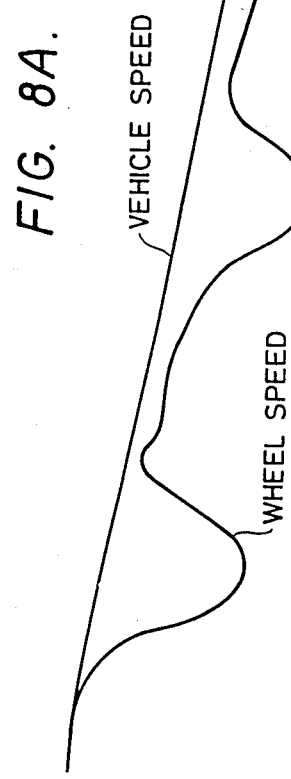
FIG. 8 is a timing chart showing the relationship between the wheel speed and the braking hydraulic pressure for a better understanding of the first embodiment.
Figure 8B:
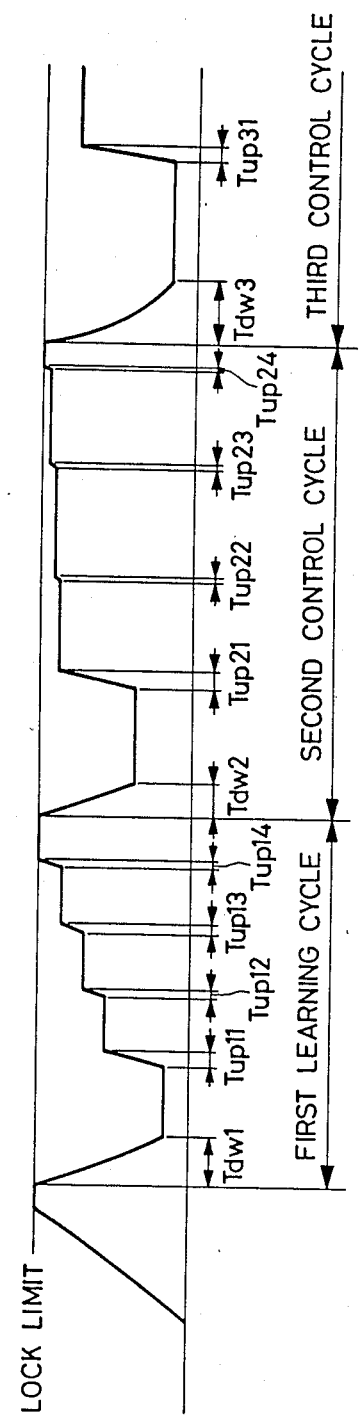

A pressure increasing time learning control for obtaining the above-mentioned learning value and the target pressure increasing time period will be described hereinbelow with reference to FIG. 7.

Larning Control Cycle

Initially, in a step 510 is checked whether the learning value is set. In the state that there is no learning value, for example, in the case of a first control cycle or after a rapid variation of the road surface conditions, the decision in the step 510 is negative, and therefore the process goes to the learning control cycle and a step 520 is executed in order to check whether the pressure decreasing mode is terminated or not. That is, if the pressure decreasing mode is not completed, the decision is negative and the learning pressure decreasing time period Tdw1 in the learning control cycle is counted. The above-mentioned learning value is cleared each time that the hydraulic pressure control is started for the excessive slip prevention, and therefore the learning value is always absent at the time of the control start.

In response to termination of the pressure decrease, the process goes to a step 540 to check whether the pressure increase of the learning control cycle is terminated or not. Here, while the stepwise pressure increasing control in FIG. 6 is effected, the decision is negative and the learning pressure increasing time period Tup1 is obtained by adding calculation, that is, Tup1 is obtained by counting the sum of the pressure increasing time periods Tup11, Tup12, Tup13, Tup 14. In response to termination of the pressure increasing mode, the decision in the step 540 becomes positive and a step 560 is executed to correct the obtained learning pressure increasing time period Tup1 and the pressure decreasing time period Tdw1 to obtain T'up1 and T'dw1. The correction of the learning pressure increasing time period Tup1 and pressure decreasing time period Tdw1 is performed for the purpose of obtaining the actual pressure increasing and decreasing time periods in consideration of the responses of the respective actuators 27, 29, 31, 33 and other valves. In a step 570, the ratio of the learning correction pressure increasing time period T'up1 and the correcton pressure decreasing time period T'dw1 (i.e., T'up1/T'dw1) is calculated in order to obtain a learning value. A step 580 is then executed so that a target hydraulic pressure coefficient K used for calculation of the target pressure increasing time period is set to 0.8 as the initial value. Thereafter, the process is terminated once.

After Learning Control Cycle

In the control cycle after the learning control cycle, since the learning value has been already obtained in the step 570, the decision in the step 510 is positive and a step 590 is then executed to check whether the pressure decreasing mode in the present control cycle has been terminated or not. If the decision in the step 590 is "NO", a step 600 is executed subsequently in order to count the present pressure decreasing time period Tdwn, that is, to measuring the time period Tdw2. If the pressure decreasing is terminated, the decision in the step 590 is "YES" and a step 610 is executed in order to correct the pressure decreasing time period to obtain the present correction pressure decreasing time period T'dwn, as similarly in the step 560. A step 620 follows to check whether the present correction pressure decreasing time period T'dwn exceeds the sum of the learning correction pressure decreasing time period T'dw1 and a predetermined time period x2. If not, that is, in the case that there is no rapid variation of the road surface state, a step 630 is executed to calculate the present target pressure increasing time period Tupo, in accordance with the folowing equation: the first target pressure increasing time period Tupo = K. the present correction pressure decreasing time period (T'dwn). learning value (T'up1/T'dw1). The above-mentioned first target pressure increasing time period Tupo is used for the first pressure increasing in the control cycle after the learning contrl cycle, i.e., in the step 380 of the stepwise pressure increasing control shown in FIG. 6.

A step 640 is then executed to check whether the pressure increasing mode is taken or not. If so, a step 650 follows to count the added pressure increasing time period Tupn. This corresponds to the stepwise pressure increasing state between time Tup21 and Tup24 in the second control cycle. That is, the added pressure increasing time Tupn, which is addition of the pressure increasing time periods Tup21, Tup22, Tup23, Tup24, is counted. In response to the termination of the pressure increasing mode, the decision in the step 640 is negative, and a step 660 is executed to correct the counted added pressure increasing time period Tupn to obtain the corrected added pressure increasing time period T'upn as similar to the process of the step 560.

Figure 9:
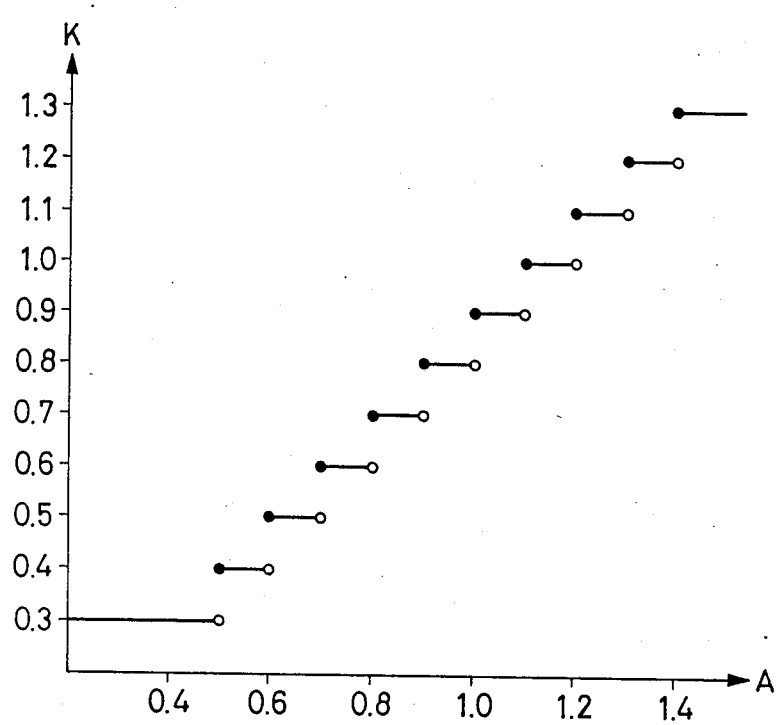
FIG. 9 is a graphic illustration for obtaining the target hydraulic pressure coefficient K.

Thereafter, in a step 670 is checked whether the corrected added pressure increasing time period T'upn exceeds the sum of the product of the present correction pressure decreasing time T'dwn of the step 610 and the learning value (T'up1/T'dw1) and a predetermined time period x2. If not exceeding, the road surface state is not rapidly varied and the decision in the step 670 is negative and a step 680 follows to correct the target hydraulic pressure coefficient K. The correction of the target hydraulic pressure coefficient K is effected in accordance with a graph as shown in FIG. 9 using a value A obtained as the following equation.

A = Corrected added pressure increasing time T'upn/learning value.pressure decreasing time T'dwn This correction is performed for the purpose of correcting the slippage of pressure increasing and decreasing with the passage of time. Here, the target hydraulic presure coefficient K is used in the step 630 for establishing the target pressue increasing time period and the target pressure increasing time period is used in the step 380 of the stepwise pressure increasing control for the first pressure increasing. Thus, the first pressure increasing in the control cycle after the learning control cycle is always set to the vicinity of the locking limit pressure. Therefore, the pressure increasing thereafter assumes a smaller value (steps 390, 400) as compared with the case of no learning value (steps 340, 350), resulting in maintaining a high braking force immediately before the excessive slipping for a long time. In the case that the decision in the step 620 or 670 is positive, the pressure decreasing time and the pressure increasing time are greatly varied because of rapid variation of the road surface state. In this case, since it is not proper to use the learning value, the learning value is cleared.

In the $n^{th}$ control cycle after calculation of the learning value in the learning control cycle (n=2, 3, ...), if the road surface state is not greatly varied, the present target pressure increasing time Tupn is calculated in a series steps of 510, 590, 600, 610, 620, 630, 640, 650, 660, 670, and 680. On the other hand, before reaching the $n^{th}$ cycle, if the road surface state is greatly varied, the learning value is cleared in the step 620 or 670, and a new learning value for the varied road surface state is obtained in the steps 520 to 580.

In this embodiment, the hydraulic pressure sensor is not used, and the braking hydraulic pressure can be easily increased at a time to the vicinity of the locking limit pressure at the first increasing time in the control cycle after the learning control cycle irrespective of difference of inertia due to the rapid braking, soft braing and speed change ratio, resulting in effective braking operation. In addition, since, after increased to the vicinity of the locking limt pressure at the first pressure increasing time, the hydraulic pressure is guradially increased in steps, it is possible to provide an effective braking for a long time. Furtehrmore, since the target hydraulic pressure coefficient K is always corrected by the pressure increasing time period and the pressure decreasing time period newly obtained, the hydraulic pressure can be controlled to obtain a desirable braking state irrespective of the slippage of the target hydraulic pressure coefficient K with the passage of time. This results in shortening the braking distance and making stable the braking force and further improving the braking feeling.

In the above-mentioned first embodiment, the learning value is obtained by (learning correction pressure increasing time period T'up1)/(learning correction pressure decreasing time period T'dw1) in the learning control cycle, and the first target pressure increasing time period Tupo is determined by performing multiplication on the learning value, the present correction pressure decreasing time period T'dwn in the control cycle therafter and the coefficient K. However, it is also appropriate that the time periods before corrected are used. Furtehrmore, it is appropriate that without previously obtaining T'up1/T'dwn as the learning value, the following equation is used for direct calculation.

$$Tupo = K(T'up1/T'dw1) \times T'dwn \quad (1).$$

In the equation (1), the change of the calculation order can be allowed.

Furthermore, in the case that control is performed to provide a temporary pressure maintaining mode during the pressure decreasing, the time period other than the maintaining mode may be counted as the pressure decreasing time period.

Figure 10:
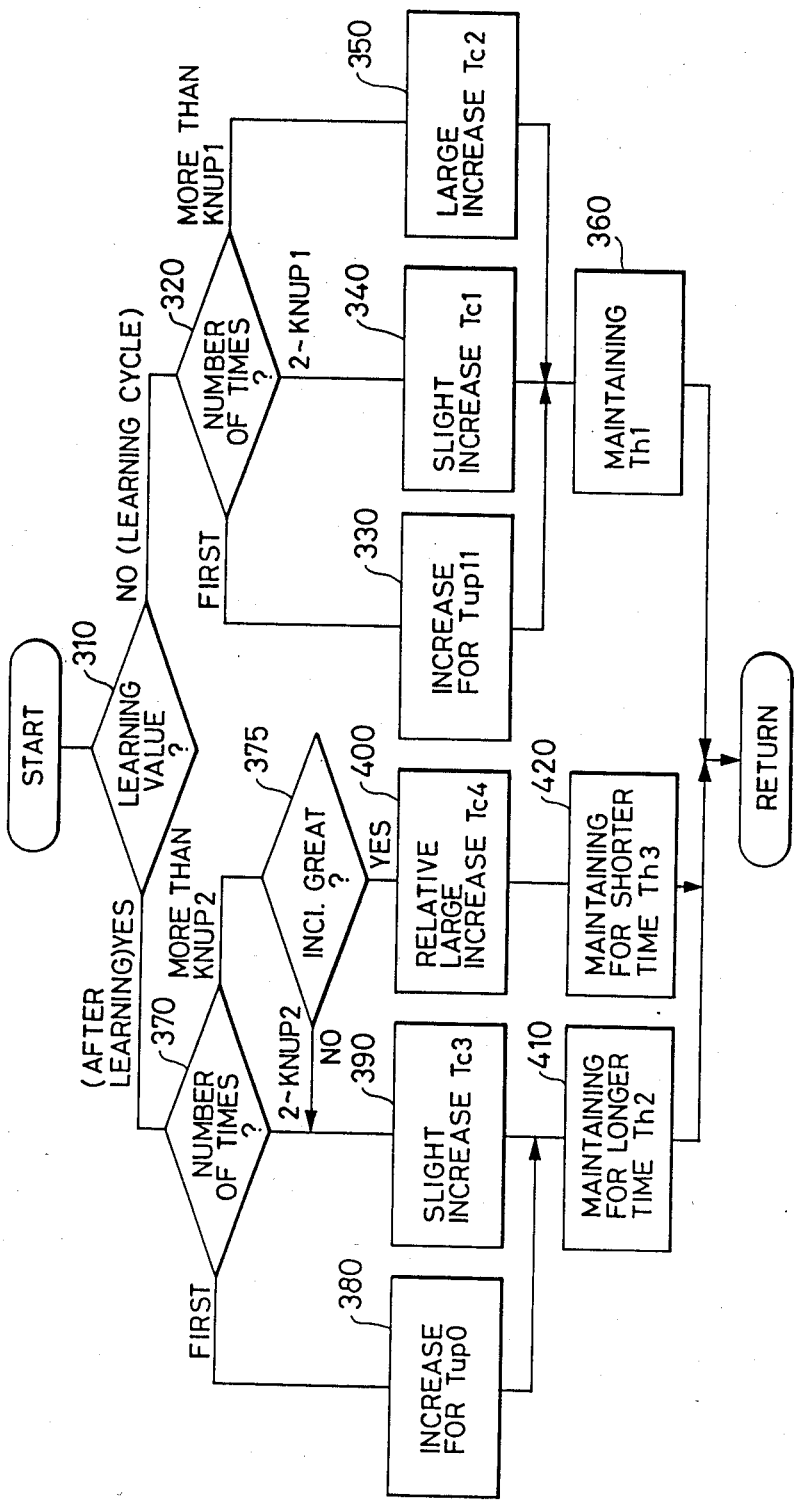
FIG. 10 is a flow chart for describing operation executed in a second embodiment.

A second embodiment of the present invention will be described hereinbelow with reference to FIGS. 10 through 12.

In the first embodiment, it is assumed that the pressure decreasing time period is proportional to the decreased value of the hydraulic pressure, and the pressure decreasing time periods Tdw1 and Tdwn are used therefor. However, in the actual hydraulic pressure pipe system, the actual hydraulic pressure decrease value is in non-linear relation to the pressure decreasing time period. The second embodiment is made in consideration of this point.

In the second embodiment, as the learning pressure decreasing value in the learning control cycle and the pressure decrease value in the $n^{th}$ control cycle therafter, $\{1-\exp(-T'dw1/T1)\}$ and $\{1-\exp(-T'dwn/T1)\}$ are used. The values corresponding to these may be calculated in advance and stored as a map in a memory. T'dw1 represents the corrected pressure decreasing time period in the learning control cycle, T'dwn is the corrected pressure decreasing time period in the $n^{th}$ control cycle, and T1 is a constant previously determined in accordance with the hydraulic pressure system. Although the basic hydraulic pressure control in the second embodiment is similar to the process of the first embodiment, the stepwise pressure increasing control and the pressure increasing time learning control are slightly differed therefrom and thus will be described with reference to FIGS. 10 and 11. In the stepwise pressure increasing control shown in FIG. 10, a step 375 is further provided for checking whether a flag is set to indicate that the pressure increasing inclination is great, and in accordance with the decision, the step 400 is executed if the decision is "YES" and the step 390 is executed if the decision is "NO". Exception that in the step 370 the number of decisions is changed for convenience, the other steps are equal to those in the first embodiment.

Figure 11:
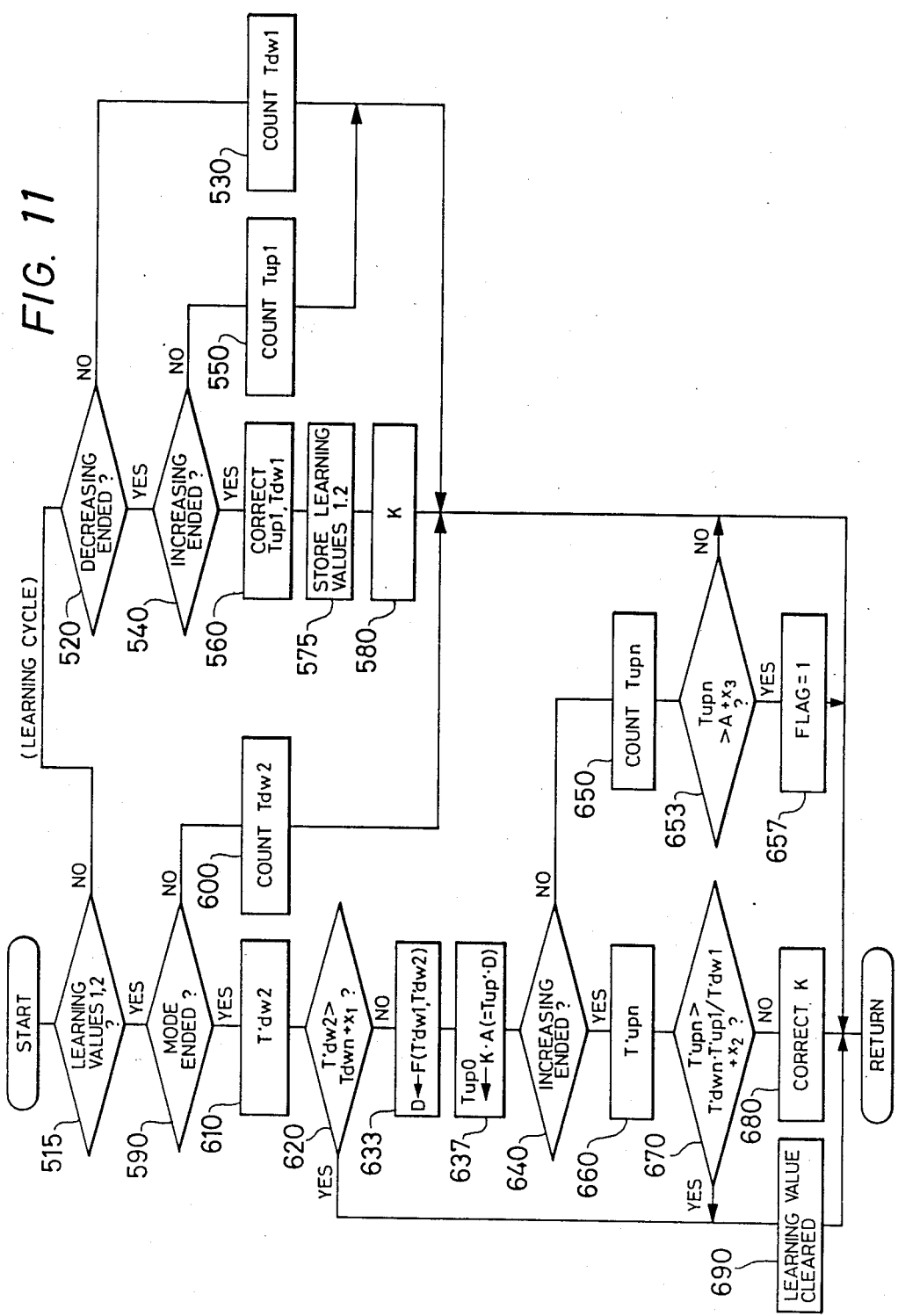
FIG. 11 is a flow chart for describing the pressure increasing time learning control in the second embodiment.
Figure 12A:
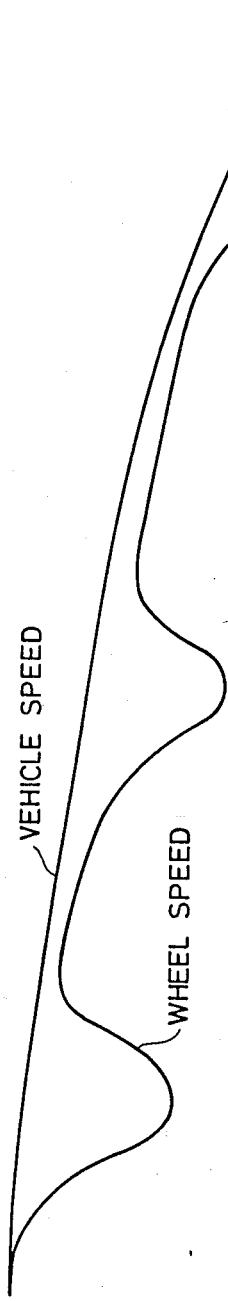
FIG. 12 is a timing chart illustrated for a better understanding of the second embodiment.
Figure 12B:
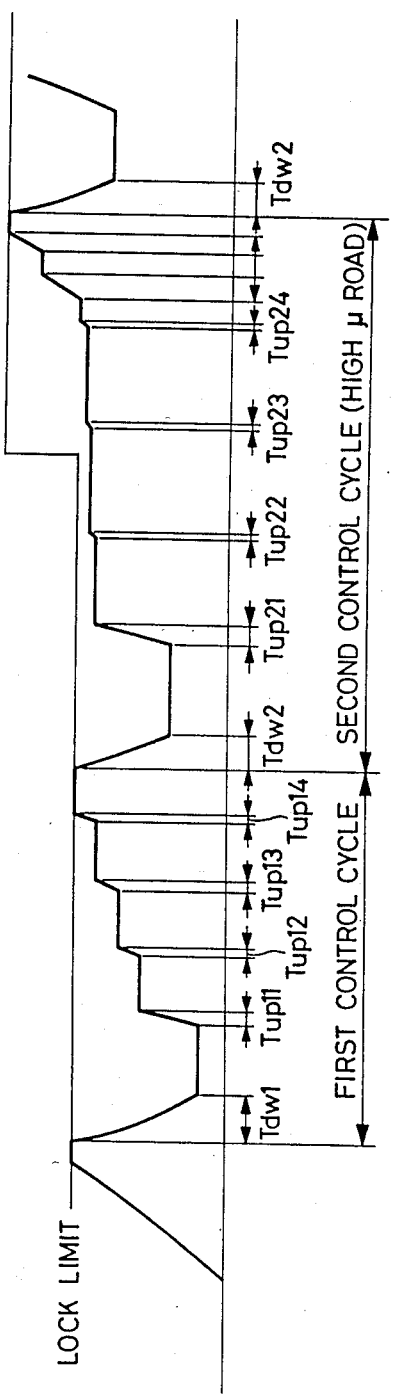

In the pressure increasing time period learning control in FIG. 11, steps 515, 575, 633 and 637 are provided instead of the steps 510, 570, 630 in the first embodiment, and steps 653 and 657 are further provided therein. The step 515 is executed to check whether learning values 1 and 2, which will be described hereinafter, are present. In the step 575, the learning correction pressure increasing time period T'up1 and learning correction pressure decreasing time period T'dw1 in the learning control cycle are stored respectively as the learning values 1 and 2. In the step 633, the decreased pressure ratio D is calculated on the basis of the learning correction pressure decreasing time period T'dw1 in the learning control cycle and the present correction pressure decreasing time period T'dwn in the present control cycle, i.e., as function of F(T'dw1, T'dwn), in accordance with the following equation.

$$D = \{1 - \exp(-T'dwn/T1)\}/\{1 - \exp(-T'dw1/T1)\}$$

This decreased pressure ratio D is calculated in adivance and may be obtained using a map. The step 637 is executed to calculate the first target pressure increasing time period Tupo in accordance with the following equation.

Tupo = K.learning correction pressure increasing time T'up1.decreased pressure ratio D, where K is the target hydraulic pressure coefficient as described above and initially set to 0.8. here, T'up1.D corresponds to the locking vicinity pressure increasing time period A taken for reaching the locking limit hydraulic pressure, this time period A is also calculated in the step 637. The step 653 is executed to check whetehr the added pressure increasing time period Tupn exceeds the sum of the lock vicinity pressure increasing time period A and a predetermined time period x3. If not, the process is terminated once. If the decision is "YES", the step 657 is executed to set the flag indicating that the pressure increasing inclination is great. Therefore, it is estimated that the added pressure increasing time period Tupn becomes more than a predetermined value, that is, the road surface $\mu$ state is varied to a high $\mu$.

The features of the control according to the second embodiment will be described hereinbelow with reference to FIG. 12. If the road surface is not varied, the second embodiment is operated as in the first embodiment. That is, the first control cycle is the learning control cycle and the learning pressure decreasing time period (Tdw1) and the learning pressure increasing time (Tup11+Tup 12) can be obtained, and then the target pressure increasing time period (Tupo) at the time of first pressure increasing in the second control cycle can be obtained on the basis of the learning pressure decreasing time period and the learning pressure increasing time period and furtehr the pressure decreasing time perod (Tdw2) whereby the hydraulic pressure is controlled.

Here, for describing the difference between the first embodiment and the second embodiment, it is assumed that during the second control cycle the road surface state is varied to the high $\mu$ side and the locking limit hydraulic pressure has become higher. When the added pressure increasing time period Tupn exceeds the sum of the lock vicinity pressure increasing time period A and the predetermined time period x3, the decision in the step 653 in FIG. 11 becomes positive, and the flag indicating that the pressure increasing inclination is great is set in the step 657. When the number of pressure increasing becomes KNUP1, the step 375 is executed. The decision therein is positive because the flag is set, followed by the step 400 in which a slightly great pressure increasing is performed (Tc4), and furtehr followed by the step 420 in which the perssure maintaining is performed for a shorter time period (Th3). If the number of pressure increasing is not less than KNUP1 and the flag indicating that the pressure increasing inclination is great is set, the stepwise pressure increasing control is performed in the steps 370, 375, 400 and 420. This corresponds to the rapid stepwise pressure increasing after the time 24 of FIG. 12. Therefore, even if the road surface state is changed to a high μ state during the slip control on the braking, it is possible that the braking hydraulic pressure is rapidly closed to the vicinity of the lock limit pressure, resulting in an effective braking operation.

In the above-mentioned first and second embodiments, in the case that the road surface state is greatly changed, the learning value is cleared for the first time and a new learning for the road surface state is obtained. It is also appropriate that each of the control cycles is set to the learning control cycle to update the learning value at every cycle and the target pressure increasing time period in the control cycle immediately thereafter is obtained on the basis of the updated learning value. This is easily acheived by performing the calculation for updating the learning value, instead of the calculation for correcting the target hydraulic pressure coefficient K in the step 680 in the first and second embodiments. For example, in the first embodiment, T'upn (corrected added pressure increasing time period)/T'dwn (present correction pressure decreasing time period) may be updated as the learning value, and in the second embodiment, T'upn may be updated as the learning value 1 and T'dwn may be updated as the learning value 2. In this case, in the second control cycle or the control cycle after the second control cycle, the learning value in the control cycle immediately therebefore is used, and thereforean effective braking operation can be performed in response to variations of the road surface state.

In the present invention, the learning pressure decreasing and learning pressure increasing are obtained in the learning control cycle and the present pressure decreasing is obtained in the next control cycle, and the lock limit pressure is estimated on the basis of the obtained values and the first target pressure increasing value is calculated. Therefore, in the control cycle after the learning control cycle, on the basis of the target pressure increasing value, the hydraulic pressure can be closed to the vicinity of the lock limit pressure at the initial time. This allows to effectively perform the braking operation, and allows easy application even if there is the difference in the braking responsibility between motor vehicles because the learning value is used.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A wheel slipping control apparatus for controlling a braking hydraulic pressure to be applied to a wheel, comprising:

sensor means for detecting a rotational speed of said wheel;

detection means for detecting the slipping state on the basis of the detected rotational speed of said wheel;

control means for generating a control signal in accordance with the detected slipping state so as to perform a braking pressure control cycle so that the braking hydraulic pressure is set to a pressure decreasing mode and then to a pressure increasing mode; and pressure adjusting means for controlling the braking hydraulic pressure in accordance with the generated control signal, wherein said control means including:

means for determining one of the braking pressure control cycles to be performed as a learning control cycle;

means for obtaining a learning pressure-decreased value corresponding to the magnitude of pressure decremented in the learning control cycle;

means for obtaining a learning pressure-increased value corresponding to the magnitude of pressure incremented in the learning control cycle;

means for obtaining a present pressure-decreased value corresponding to the magnitude of pressure decremented in a control cycle after the learning control cycle; and means for calculating a target pressure-increased value on the basis of the obtained learning pressure-decreased value, learning pressure-increased value and present pressure-decreased value, and for generating a signal indicative of the calculated target pressure-increased value to said pressure adjusting means so that the braking hydraulic pressure is first increased to the vicinity of a wheel locking limit pressure after decreased in the pressure-decreasing mode.

2. A wheel slipping control apparatus as claimed in claim 1, wherein said learning control cycle determining means determines the learning control cycle in accordance with the absence of the learning pressure-decreased value and the learning pressure-increased value.

3. A wheel slipping control apparatus as claimed in claim 2, wherein, when the present pressure-decreased value becomes over the sum of the learning pressure-decreased value and a first predetermined value, the learning pressure-decreased value and the learning pressure-increased value are cleared.

4. A wheel slipping control apparatus as claimed in claim 2, wherein, after the braking hydraulic pressure is increased in accordance with the target pressure-increased value indicating signal and further increased in steps to the wheel locking limit pressure, if the added pressure-increased value becomes over the sum of the target pressure-increased value and a second predetermined value, the learning pressure-decreased value and the learning pressure-increased value are cleared.

5. A wheel slipping control apparatus as claimed in claim 1, wherein the target pressure-increased value T is calculated as the following equation, $$T = K \cdot \text{learning pressure-increased value/learning pressure-decreased value} \cdot \text{present pressure decreased value},$$

where K is constant.

6. A wheel slipping control apparatus as claimed in claim 5, wherein said constant k is corrected when the present pressure-decreased value is below the sum of the learning pressure-decreased value and a first predetermined value and when a pressure-increased value corresponding to the overall magnitude increased in the control cycle after the learning control cycle is below the sum of the target pressure-increased value and a second predetermined value.

7. A wheel slipping control apparatus as claimed in claim 1, wherein, in the learning control cycle, after once decreased, the braking hydraulic pressure is increased for a pressure increasing time period which is calculated on the basis of the wheel acceleration and then increased in steps for a first predetermined time period, and in the control cycle after the learning control cycle, after once decreased, the hydraulic pressure is increased by the target pressure-increased value and further increased in steps for a second predetermined time period, said second perdetermined time period is shorter than said first predetermined time period so that the hydraulic pressure in the control cycle is maintained to a value near the wheel lock limit value.

8. A wheel slipping control apparatus as claimed in claim 1, furthter comprising stopswitch means for generating a signal in response to depression of a brake pedal for braking the wheel, and wherein said control means generates said control signal when said signal from said stopswitch means is present.

9. A wheel slipping control apparatus as claimed in claim 8, wherein said control means further performs a pressure maintaining mode for maintaining the braking pressure as it is, and said control means compares the wheel speed and the wheel acceleration with a reference wheel speed and a reference wheel acceleration and then selects a pressure control pattern from the pressure decreasing mode, the pressure maintaining mode and the pressure increasing mode in accordance with the result of the comparison.

* * * * *